United States Patent [19]

Appiano et al.

[11] Patent Number: 4,800,423

[45] Date of Patent: Jan. 24, 1989

[54] INTERFACE MODULE FOR SUPERIMPOSING ALPHANUMERIC CHARACTERS UPON RGB VIDEO SIGNALS

[75] Inventors: Silvano Appiano, Montafia; Wolmer Chiarottino, Villanova; Mauro Pozzi, Turin; Aldo Reali, Caselle Torinese, all of Italy

[73] Assignee: Sip- Societa Italiana per L'Esercizio Delle Telecomunicazioni S.P.A., Turin, Italy

[21] Appl. No.: 118,579

[22] Filed: Nov. 6, 1987

[30] Foreign Application Priority Data

Dec. 18, 1986 [IT] Italy .............................. 67943 A/86

[51] Int. Cl.[4] ......................... H04N 9/76; H04N 5/272

[52] U.S. Cl. .................................. 358/21 R; 358/183; 358/903; 340/721

[58] Field of Search .................... 358/21, 22, 181, 183, 358/1; 340/721; 358/903

[56] References Cited

U.S. PATENT DOCUMENTS 4,374,395 2/1983 Herrmann et al. .................. 358/183
4,425,581 1/1984 Schweppe et al. ................. 358/183
4,460,918 7/1984 Flasza .............................. 358/21 R
4,477,830 10/1984 Lindman et al. ................. 358/21 R
4,496,976 1/1985 Swanson et al. .................... 358/183
4,532,540 7/1985 Wine ................................ 358/21 R
4,599,611 7/1986 Bowker et al. ...................... 358/183
4,644,401 2/1987 Gaskins .............................. 358/183

FOREIGN PATENT DOCUMENTS 71792 4/1986 Japan .

*Primary Examiner*—John W. Shepperd
*Attorney, Agent, or Firm*—Herbert Dubno

[57] ABSTRACT

An interface module for superimposing alphanumeric characters upon external RGB video signals received by a SCART connector of a television set is disclosed. The interface includes a central processing unit (CPU) controlling the command input from an alphanumeric keyboard, remote control, touch screen functions, and message exchange with a processing center through the D channel of an ISDN network. The CPU controls a video display processor which outputs a switching signal to the SCART connector and R, G, B video signals to an encoder which encodes a composite color signal in a standard format such as PAL, SECAM or NTSC. The superimposing is done in the SCART connector by switching between the external R, G, B video signals and the composite color video from the encoder.

6 Claims, 3 Drawing Sheets

INTERFACE MODULE FOR SUPERIMPOSING ALPHANUMERIC CHARACTERS UPON RGB VIDEO SIGNALS

DESCRIPTION

The present invention concerns systems requiring the extension of display performances to commercial type devices, and more particularly an interface module for superimposing alphanumeric characters upon RGB video signals.

The use of display devices of the commercial type, such as television sets or monitors, for applications different from usual video-image broadcasting is compulsory to extend new services to common TV users.

E.g. the implementation of a system allowing the access through the usual telephone networks to broad-band services by common television users, requires the implentation of simple, non-cumbersome and cost-effective circuits, to connect to a conventional commercial TV set or monitor to allow an efficient and optimal representation of video images and alphanumeric scripts originated in user-network dialogue.

Among the facilities offered by a broad-band system the following are worth mentioning: videocommunication services, with video and audio signals multiplexed in a single broad-band channel or separated; HiFi diffusive audio and video signals, recorded or interacting, forwarded by a service centre; services of participative television, where a user can generate broadcast programs.

The structure of a broad-band network is composed of:

- user's installations comprising display devices and inteface modules for the connection to the distribution network;
- an ISDN exchange (Integrated Services Digital Network) representing the first user's party through channel D whereupon signalling is sent both for ISDN and broad-band services, and which sends its signalling towards the broad-band exchange;
- a broad-band exchange, which receives from a service centre and sends through the distribution network to users broad-band signals; as to the signalling it dialogues on one hand with the ISDN exchange and on the other hand with the service centre when the requests are to be controlled by the service centre itself;
- a service centre, which is the centralized module controlling recorded and interacting services.

Then a user installation, to be connected to broad-band services, will comprise a television set or a commercial monitor, an interface towards the broad-band exchange and an interface towards channel D of ISDN network.

The interface towards channel D of ISDN network is to carry out two main functions: on the video terminal side is to mix the image signal, supplied to the interface by the broad-band exchange and consisting of the three base-band components of RGB (R=red, G=green, B=blue) video signal, with the locally-generated alphanumeric signals deriving from the interactive dialogue with the user, and on the distribution network side it is to control the user's dialogue with ISDN exchange through channel D.

Further, supplementary functions are demanded, such as the control of the users dialogue through data input devices such as alphanumeric keyboard, remote control, touch-screen function (if present in the display device).

The performance of the video signal thus mixed is to be maintained at the same level as that of the original RGB signal, while low-cost and low-size requirements are to be ensured, since that interface is to be physically housed near each display device at the user's premises.

Circuits known in the art for mixing the images and characters generally act on the image signal in the adopted TV standard, as for instance composite PAL, and operate in the TV set circuits downstream of the first intermediate frequency of the radiofrequency signal to mix the alphanumeric characters converted in turn into the same TV standard.

In case of intervention upon the image signal, already converted into an RGB signal at the display device input, as in the case of the broad-band network, the circuits already known in the art can be used without intervening on the internal circuitry of the display device, since this device has to be of commercial type, provided a previous external conversion of the image signal from RGB to the the adopted standard (e.g. PAL) is carried out. Yet, this conversion involves a consequent degradation of the quality of the signal produced and a cost increase.

An external circuit capable of carrying out a direct mixing of RGB image signals with RGB alphanumeric signals, with a resulting RGB flow, is to be avoided since it entails serious problems as to complexity, encumbrance and costs.

Said problems are solved by the present invention of an interface module for channel D of ISDN network, which mixes an RGB video signal with alphanumeric characters in the adopted TV standard, e.g. composite PAL, and which allows the use of a commercial-type TV set or monitor, provided it is equipped with SCART connector it supplies with the mixed video signal. The interface presents total-modularity characteristics, since it allows separable functions of: input of the usual video diffusive signal through the antenna plug; input of RGB video signal with or without superimposition of alphanumeric characters, mixed with known windowing or superimposing techniques; use of data input devices such as alphanumeric keyboard, remote control, touch-screen function (if provided by the TV set); bidirectional connection on channel D of ISDN network.

The use of said interface can hence be extended to any RGB video-image signal source, for example a broad-band exchange, and is not tied to the dialogue with the ISDN exchange.

The present invention provides the interface module described in claim 1.

An alternative circuitry embodiment described in claim 4 is also provided.

The characteristics of the present invention will be made clearer by the following description of a preferred embodiment thereof as well as of an alternative embodiment, given by a way of a non-limiting example, and by the annexed drawings in which.

Figure 1:
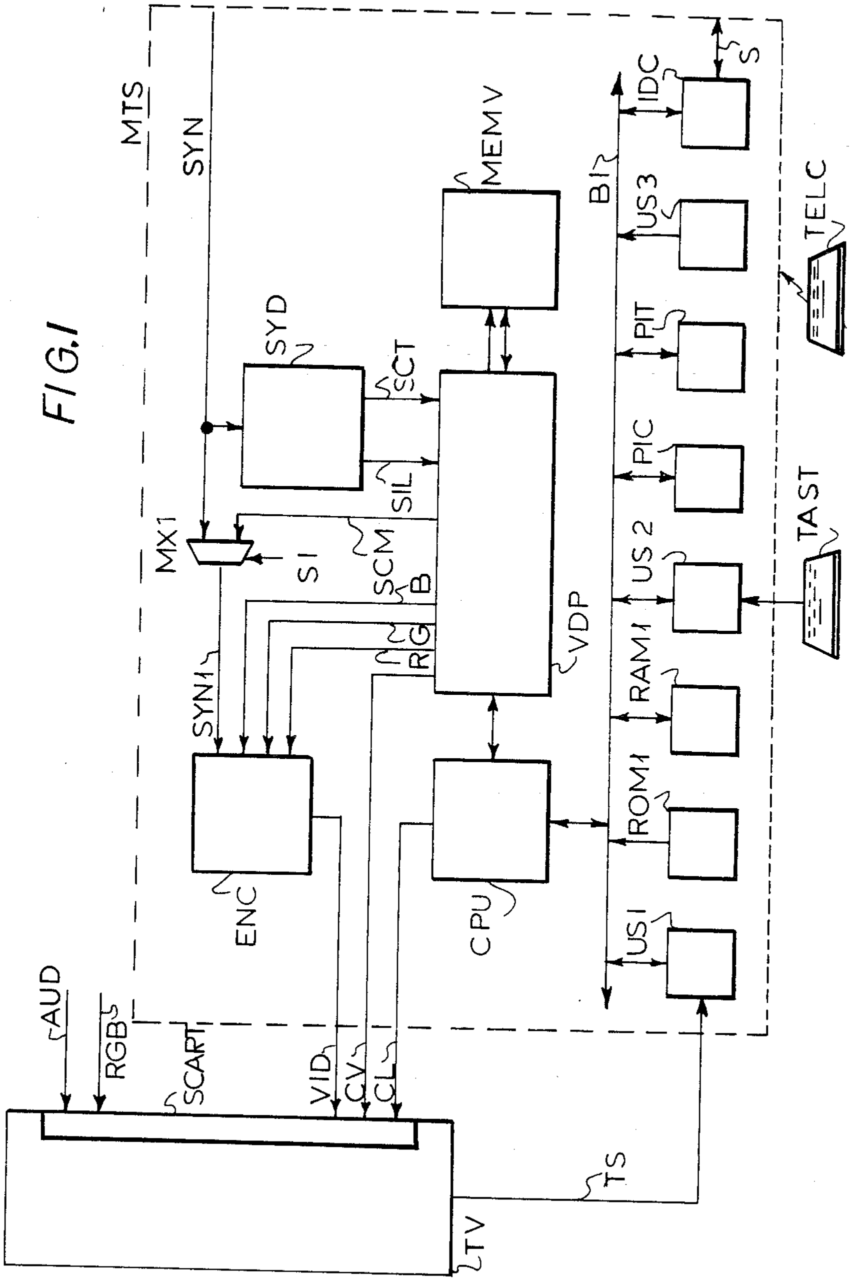
FIG. 1 shows the circuit diagram of the interface module provided by the invention.

In FIG. 1 TV denotes a video monitor or a television set of the commercial type, of whatever known type, provided it is equipped with the SCART connector.

SCART connector inputs are defined in EN50049 specification adopted on the Oct. 27, 1982 at Athens by CENELEC (European Committee for Electrotechnical Standardization); said specification, in addition to nominal voltage and impedance values, defines the following possible inputs, denoted also in FIG. 1:

- an audio input AUD of the monophonic or of the stereophonic type;
- an RGB input of the three primary colour components of red, green and blue video signal, in base band without synchronization;
- a VID input of a composite PAL video signal, which can consist of the single composite video signal, or of a complete base-band signal;
- a fast switching signal CV, which selects VID or RGB inputs according to its polarity;
- a slow switching signal CL, which chooses for TV the input either from SCART connection or from ordinary TV antenna, not shown in the figure.

The specification above also defines a number of outputs which yet do not interest the present invention and therefore will not be mentioned.

TV can also be equipped with the auxiliary function known in the art as "touch-screen": by touching with the fingers the screen at determined points, an internal TV set circuitry generates a signal, supplied at the auxiliary output TS, carrying a pair of coded orthogonal coordinates identifying the touched point.

MTS indicates by a dashed line the interface module provided by the invention. MTS is to generate either the simple composite image synchronism signal for TV set, or PAL-composite image signal, partly or totally replacing the signal possibly present at RGB input.

Said image signal consists of alphanumeric character sequences appearing on the screen as a consequence of dialogue procedures providing one or more data inputs e.g. from alphanumeric keyboard TAST, from remote control TELC, from output TS of "touch-screen" of TV set.

Said procedures also comprise bidirectional dialogue, through bus S, with an exchange of ISDN network on digital subscriber line called "channel D".

MTS comprises circuit blocks hereinbelow described and surrounded in FIG. 1 by a dashed line.

ENC denotes a video-colour image encoder, which converts RGB video signal it receives at the input, consisting of composite synchronism SYN1 and of the three primary colour components R (red), G (green) and B (blue), into a composite-PAL video signal it supplies at the input VID of SCART connector.

For example, ENC can be implemented with TEA2000 component made by Mullard Limited.

MX1 denotes a common multiplexer which sends onto SYN1 external composite synchronism signal, or composite synchronism SCM generated by block VDP. MX1 is controlled by block VDP. MX1 is controlled by selecting signal S1 generated by block CPU.

SYD denotes a known block separating frame and line synchronism signals from composite synchronism SYN.

Line SLL and frame SCT synchronism signals are supplied to block VDP.

Block SYD can be implemented with an integrated circuit indicated by SN96533 made by Texas Instruments.

VDP denotes a block carrying out the known function of video image processor, i.e. of generator of video signals relevant to alphanumeric characters to be vizualized on the screen. VDP addresses during reading and writing phases a video memory MEMV containing the coding of alphanumeric characters, and dialogues in bidirectional way with a data processing unit CPU whereby is controlled. VDP generates composite synchronism signal SCM, the three primary colour components R, G, B of the video signal relevant to alphanumeric characters, and fast switching signal CV.

VDP can be implemented with the integrated circuit indicated by TMS3556, made by Texas Instruments; said firm supplies also a data sheet of the component wherefrom useful information to implement the dialogue between VDP and memory MEMV and processing unit CPU can be obtained.

CPU indicates the data processing unit which is to decode the information coming from the various data inputs, such as TELC, TAST, bus S, TS and to control VDP so as to generate the video signal relevant to alphanumeric characters.

BI denotes a bus inside the CPU, which is connected to various circuit blocks described hereinbelow.

ROM1 denotes a known-type ROM containing the microprogram executed by CPU, which will be described hereinafter.

RAM1 denotes a known-type RAM memory for data.

PIC denotes a known-type circuit, which controls the interrupt signals activating corresponding operative modules of the microprogram.

PIT denotes a known-type module carrying out timing functions; it also generates an impulse at regular intervals which forms one of the "interrupt" signals forwarded to PIC.

US1, US2, US3 denote known-type interface circuits which convert data flows arriving at their inputs into compatible format for the transfer onto bus BI: in addition at the presence of input data they generate an "interrupt" signal sent to block PIC.

US1 receives the data at the output TS of touch-screen of TV set; US2 from keyboard TAST; US3 from a known-type receiver, not represented in the figure, of data coming from remote control TELC.

US1, US2, US3 can be implemented with integrated circuits of 8274 type, made by INTEL.

Said circuits receive and recognize characters sent asynchronously according to RS232C standard corresponding to CCITT Recommandations V4, V24, V28.

IDC denotes a circuit acting as an interface on the line side, to allow the dialogue with transmission line through bus S. Its design depends on the type of transmission line used. If the line is to be connected to ISDN network, then IDC is implemented by an integrated circuit of 79C32 type by AMD (Advanced Micro Devices), which manages levels 2 and 3 of the access protocol to channel D of ISDN network in accordance with CCITT Recommandations Q920/1, Q930/1.

Figure 2:
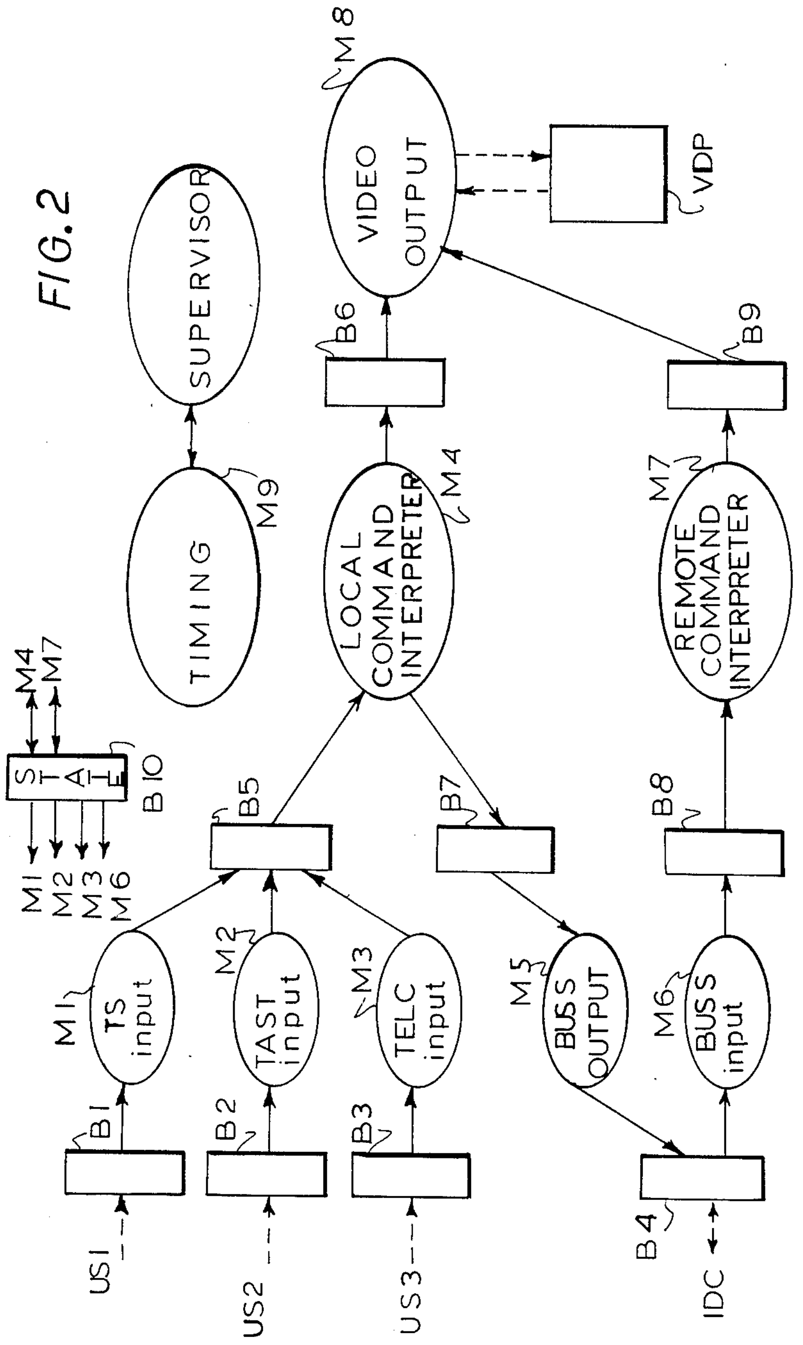
FIG. 2 shows the diagram of the operative modules into which the microprogram executed by a processing unit inside the interface module is subdivided.

Processing unit CPU operates according to the microprogram written in memory ROM1 in programming languages PLM86, ASM86, and subdived into operative modules hereibelow described with reference to FIG. 2. This figure shows the data flow between said modules and the interested main buffer registers B1, B2, . . . B10 physically stored in data memory RAM1.

The microprogram is subdivided into operative modules M1, M2, . . . M9 controlled by a supervising module hereinafter referred to as supervisor.

Operative modules have a number of states N corresponding to the number of pages of alphanumeric characters to be visualized on the screen. The states (and hence also the pages) have a tree structure starting from an initial state, corresponding to the first video page containing the first index, and which has M levels; from each state of a Mth level it is possible to pass to a certain number of states of level (m+1)-th dependent on the information arriving through data input devices.

Hence determined video page sequences, dependent on the path followed in the state tree, can be obtained. Said path can under certain circumstances be followed backwards in the tree.

Module M1: input TS.

This module is to decode the information arriving from input TS (FIG. 1) of touch-screen through interface US1, which activates an interrupt signal, detected by controller PIC, and managed by the supervisor, which in turn activates module M1.

Said information consists of an ASCII coded coordinate pair of the screen point touched by the subscriber, and is written by US1 in buffer B1.

For each state N, M1 has at its disposal in memory ROM1 (FIG. 1) a table containing the coding of the screen points which, when touched, give origin to actual commands, and another table containing the codings of such commands, addressable with the first table contents.

Module M1, at each reading in B1 of a coordinate pair, first reads in buffer B10 a coding byte of the present state allowing it to select the two tables above. Hence it checks in the first table if said coordinate pair corresponds to one of the accepted points in the present state, otherwise it does not execute the other operations and cancels the pair in B1; then it reads in the second table the command code and writes in it B5.

Module M2: input TAST.

This module is to decode the information arriving from keyboard TAST (FIG. 1) through interface US2 which activates an interrupt signal, detected by controller PIC, and managed by the supervisor, which in turn will activate module M2.

Said information consists of an ASCII coded command sent by the subscriber and is written by US2 in buffer B2.

For each state N, M2 has at its disposal in memory ROM1 (FIG. 1) a table containing the coding of said commands.

Module M2, at each reading in B2, first reads in buffer B10 the coding of the present state allowing it to select one of said tables. Hence, by B2 contents it addresses the table wherefrom it extracts a command it writes into buffer B5.

It is worth noting that command tables used by modules M1 and M2 have a different structure, since the information useful to their addressing is different, but they contain commands coded in the same way, such as to uniform the criterion by which they will be interpreted.

Module M3: input TELC.

This module carries out functions analogous to those of module M2, but they are devoted to decode the information arriving from remote control TELC (FIG. 1) through interface US3 which activates an interrupt signal, forwarded to controller PIC and managed by the supervisor which will activate M3.

Said information is written by US3 into buffer B3 and consists of a coding of commands sent to the subscriber which may be written in ASCII code, as in the case of keyboard TAST, or in another code more convenient to remote control. In the latter case module M3 is to carry out preliminary operations of known type for the conversion into transmission ASCII code.

Commands contained in B5 can be of the following two types: commands of passing to another video page (with state change) and/or commands of writing in the same video page, possibly in determined positions, of alphanumeric characters sent by the subscriber (permanence in the same state).

Further commands are also possible allowing the choice of one of the following display modalities:

(a) display of alphanumeric characters forming a video page (comprising fixed characters and possibly characters sent by the subscriber) in the absence of image signal coming from input RGB (FIG. 1);

(b) display of unique images present at RGB input;

(c) display of alphanumeric characters of video pages superimposed upon the signal of RGB input with the known windowing technique, which provides a display of the whole matrix of the points of the character (character and background);

(d) display of the alphanumeric characters of the video pages superimposed upon the signal of input RGB with the known 'superimpose' technique, providing a display of the only significant character points.

Other possible commands concern data forwarding through bus S on the transmission line: said data are the coded responses consequent to the display of messages coming the line itself, which responses can comprise alphanumeric characters introduced by the user.

The dialogue with the transmission line always provides an echo on the video screen which entails the display of characters with the already-seen modalities.

Module M4: local command interpreter.

This module is activated by the supervisor in presence of commands to be interpreted in buffer B5.

In presence of a video-page change command in B5, M4 above all modifies the state byte in buffer B10; then it writes in buffer B6 a coding of the new video page.

In presence of a video write command in B5, M4 does not modify B10 contents, while it writes in B6 the coding of characters to be displayed and of the relevant video coordinates, beside refreshing the present video page.

In addition M4 forwards again in B6 possible commands of modification of the display modalities which do not entail state byte modification in B10.

Furthermore M4 writes in buffer B7 messages relevant to data read in B5 to be sent onto bus S; said messages comprise a coding heading of the message type, followed by parameters comprising the possible characters sent through video.

The dialogue with the transmission line comprises, as already mentioned, the relevant echo on the video: hence M4 writes in B6 commands of change of page and/or writing of characters with the modalities already mentioned, besides possibly modifying state byte in B10.

Module M5: data output on bus S.

This module is activated by the supervisor in presence of messages in buffer B7.

M5 reads in B7 and writes in buffer B4 of the FIFO type (First In First Out) messages in form readable by block IDC (FIG. 1); besides it supplies an activating signal to IDC which will forward it onto bus S.

Module M6: data input from bus S.

This module has the opposite task of M5, i.e. it reads in buffer B4, decodes and writes in buffer B8 the messages coming from bus S, written by interface IDC. M6 is activated by the supervisor upon receiving an interrupt signal generated by IDC when receiving messages form bus S.

Messages coming from bus S contain commands similar to the locally-generated ones, i.e. relevant to display of new video pages and/or isolated alphanumeric characters. Hence as to what concerns the decoding of said commands, module M6 carries out operations equivalent to those carried out by M1, M2, M3, by reading the state byte in buffer B10 and codings of commands, to be written in B8, in convenient tables present in memory ROM1.

Module M7: remote command interpreter.

This module is activated by the supervisor in presence of commands in buffer B8.

The task of M7 is equivalent to that of M4, as to the interpretation of commands entailing page and/or character display, it writes in buffer B9, and reading and possible modification of state byte in buffer B10.

Module M8: video output.

This module has the task of managing the dialogue with block VDP (FIG. 1) to send it video-page information, on the basis of the commands read in buffers B6 or B9, and is activated by the supervisor in presence of said commands.

In the particular non-limiting example described here, the video pages at the output VID of MTS (FIG. 1) have a matrix structure formed by 25 lines with 40 characters per line; each character is comprised in an $8\times10$-pixel matrix.

The characteristics of each character are defined by a 2-byte word. The second byte carries the character ASCII coding, while the first defines the character properties such as colour, dimensions, display (intermittent or fixed), inversion between background and character colours, et cetera.

Memory ROM1 (FIG. 1) stores N matrices, one for each video page, carrying character definition words; some matrices have empty spaces which can be filled up with the words defining alphanumeric characters sent by the subscriber.

Module M8 reads in ROM1 the matrix of the video page corresponding to the command present in B6 or B9 and carries it to a determined area of memory RAM1; then it adds possible characters sent by the subscriber in the positions indicated by the video coordinates present in the relevant command, then it activates the dialogue with VDP.

The portion of microprogram which controls the dialogue with VDP, as well as the physical connections to be set with said block, are known and described in the user's handbook of TMS3556 component.

VDP in turn reads in RAM1 the matrix made by module M8 and composes in the video memory MEMV the video page to display with a known modality described in the handbook above.

M8 can in addition forward to VDP the commands relevant to the display modalities, that VDP will handle in a known way. In the case of display of (a) type, VDP will keep SCART connector, through input CV, always switched to input RGB.

In cases of (c) and (d) type display, VDP will supply a signal CV which switches SCART connector onto input VID for these portions of image signal consisting of video-page alphanumeric characters, i.e. in correspondence with the whole matrix of each character (case c) or of the only significant points (case d); said signal CV switches SCART connector onto RGB input for the remaining time.

Module M8 also supplies selection signal S1 to multiplexer MX1 (FIG. 1) so that it may be switched to input SYN in case of (b) type diplay, otherwise onto input SCM.

Furthermore M8 supplies slow switching signal CL which chooses for monitor TV the SCART connector input for all the display types (a), . . . (d).

Module M9: timing.

This module manages time-interval counting operations, executed by block PIT of FIG. 1, for the check, carried out by the supervisor, on the possible overflow of processing times by the various operative modules.

The supervisor activates M9 upon request of the other operative modules, by instance to check the reception of replies within determined time limits, and programs the counting operations M9 is to carry out.

Supervisor.

It is designed to check and activate the various operative modules.

To this aim it prepares a table wherein it keeps stored and updated the processing state of the various operative modules which can vary on the basis of internal events (processing time limits exceeded, as determined by module M9, activation messages generated by other modules) and/or external events ("interrupt" signals activating some modules).

Operative modules processing states are: rest; ready, wherein the module is waiting for its activation; active, which corresponds to the processing phase; interrupted.

In the table, the supervisor makes the code of the module processing state correspond to the code identifying the operative module. The supervisor prepares a list of the operative modules in the ready state and establishes the modules execution order, which takes into account the priority level associated with each module and the presence of the relevant activation or interrupt signals.

More particularly the supervisor controls the stuffing degree of buffers B1, . . . B9 and activates the various operative modules which allow said buffers to be emptied, taking also into account the following priorities: modules M6, M5, M1, M2, M3, followed by M4 or M7 (according to which of the preceding one has been served) and then M8.

Figure 3:
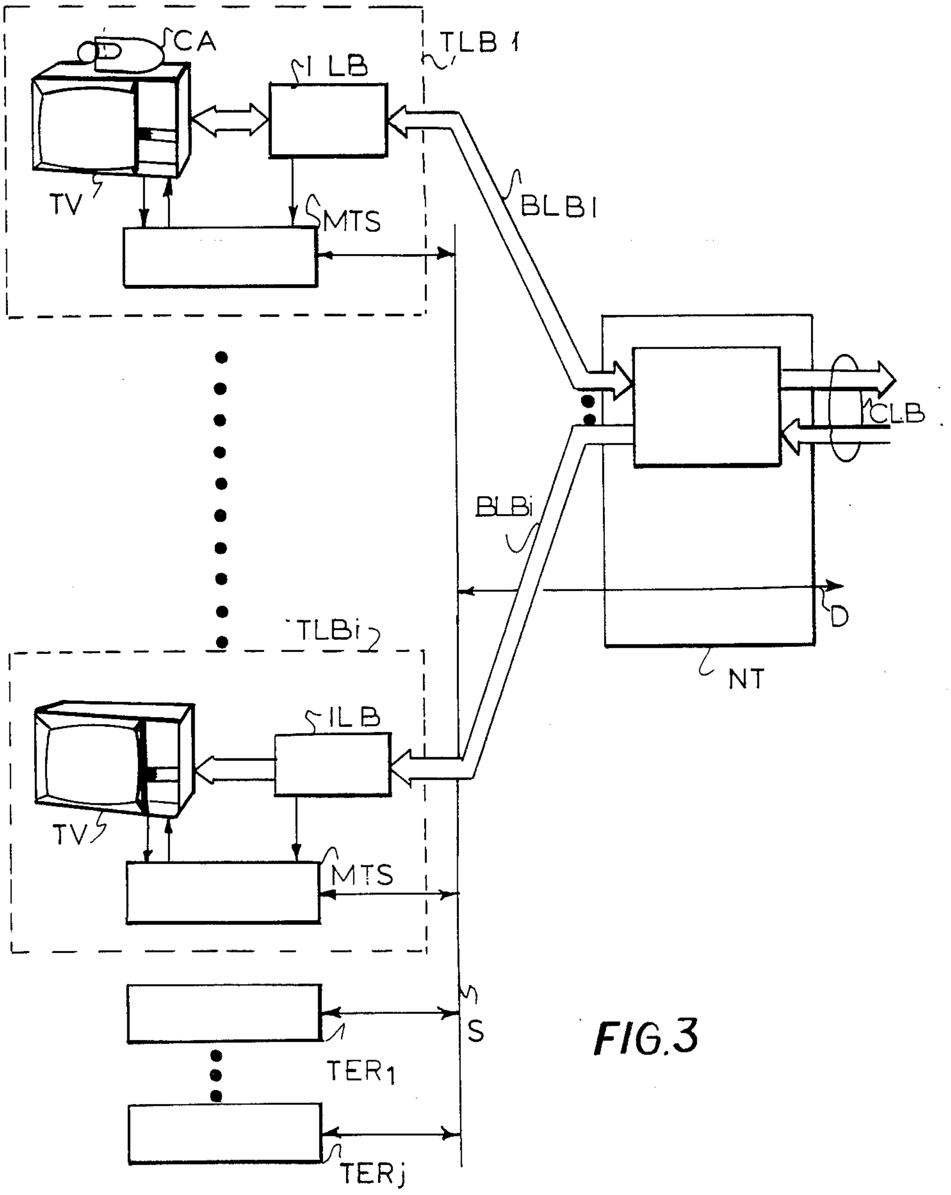
FIG. 3 shows an example of user's installation being connected to broad-band and ISDN exchanges, wherein interface modules provided by the invention are used.

FIG. 3 shows an example of subscriber's installation which is connected by means of a known-type network terminal NT, to a broad-band exchange (not-shown in the figure) through a bidirectional bus CLB, and to an ISDN exchange (this too not-shown in the figure) through channel D.

Subscriber's installation is composed of a few broadband terminals TLB1, . . . TLBi, as well as of ISDN terminals TER1, . . . TERj. The latter are terminals capable of dialoguing with ISDN exchange through bus S, common to all the terminals limitedly to ISDN services.

The broad-band signals are supplied by network terminal NT on the specific channels BLB1, . . . BLBi to each broad-band terminal.

In each channel BLBi there can be multiplexed:

a plurality of 70 (or 34) Mbit/s video flows the associated audio signal a plurality of 2 Mbit/s flows, to be used for teleconferencing or to Hi-Fi channnel transmission.

All the channels are offered to each terminal, while the relevant selection takes place locally in the terminal itself.

The generic broad-band terminal consists of: a commercial TV set or monitor equipped with SCART connector; an interface ILB towards the broad-band exchange of known structure, which is connected to BLB channel and supplies TV with audio signals AUD and video RGB signals (FIG. 1); an interface module MTS provided by the invention which extracts composite synchronism SYN from ILB, supplies TV with signals VID, CV, CL and receives the possible signal TS, and bidirectionally connects the terminal, through bus S to channel D.

In a number of terminals TLB a television camera can be provided for the partecipative television and videocommunication function.

Modifications and variations are possible without going out from the scope of the invention.

For instance a further two-input multiplexer which interrupts the bus supplying RGB signal to the homonymous input of SCART connector can be provided in interface module MTS of FIG. 1: a first multiplexer input is supplied with the RGB video signal coming from outside, while the second input is supplied with the RGB signal generated by block VDP of MTS. The multiplexer is controlled by a signal generated by operative module M8 (FIG. 2) so that it might be switched to the input coming from VDP in (a) display mode which cuts off the image signal input from the outside; besides SCART connector is switched, through signal CV, to RGB input in correspondance with the image signal, and to input VID for the display of alphanumeric characters. In this way the conversion into PAL, executed by ENC, of alphanumeric characters generated in RGB by VDP is avoided with consequent ameliorated image quality, but with a cost increase of MTS.

We claim:

1. An interface module for superimposing alphanumeric characters upon RGB video signals, said alphanumeric characters and said RGB video signals being supplied to corresponding inputs of a SCART connector of a display device, characterized in that it basically comprises:

a video signal generator (VDP) relevant to said alphanumeric characters it extracts from a video memory (MEMV), said generator supplying at the output three primary colour components (R, G, B) of said characters and a base-band video composite synchronism signal (SCM);

a video encoder (ENC) converting said three components of primary colours (R, G, B) and said video-composite synchronism signal (SCM) it receives from said video signal generator (VDP) in a base-band standard colour video signal (VID) which supplies at the input for alphanumeric characters of said SCART connector (SCART);

a data processing unit (CPU) which, on the basis of commands it receives from data input devices (TS, TAST, TELC, S), controls said video signal generator (VDP) supplying it with information determining the shape, type and position of the alphanumeric characters of a video page, and information relevant to different display types and such that said video-signal generator (VDP) may control the switching input (CV) of said SCART connector (SCART).

2. An interface module as in claim 1, characterized in that interface circuits (US1, US2, US3, IDC) are connected to that data processing unit (CPU) controlling the command input from said data input devices (TS, TAST, TELC) and/or command exchange with an external transmission line (S), ROM memories (ROM1) wherein said information is stored, for video signal generator (VDP), consisting of word matrices, each word defining said information relevant to an alphanumeric character or to an empty space, each matrix defining the structure of a video page, and in that said processing unit (CPU) reads in said ROM memories (ROM1) word matrices corresponding to input commands and sends them to said video signal generator (VDP).

3. An interface module as in claim 1, characterized in that said video signal generator (VDP) supplies the control signal to said switching input (CV) to that the SCART connector (SCART) be switched to character input (VID) during line intervals carrying significant points of the characters, while for the rest of the time be switched to the video signal input (RGB) or to character input (VID) in function of said information on the different types of display which are supplied through said data input devices or said external transmission line.

4. An interface module as in claim 1, characterized in that it comprises also a mmultiplexer, whose output feeds the video signal input RGB of SCART connector (SCART) and to whose inputs external video signal RGB and the signal generated by said video signal generator (VDP) are supplied, and in that said data processing unit (CPU), in case the display of RGB video signal is not required, controls said multiplexer so that it might be switched to the input coming from the generator (VDP), and controls the switching input (CV) of SCART connector (SCART) so that it might be switched to the external video signal input (RGB).

5. An interface module as in claim 2, characterized in that said external transmission line consists of channel D of ISDN network.

6. An interface module as in claim 1, characterized in that said video signal generator (VDP) is synchronized by frame (SCT) and line (SLL) synchronism signals generated by a synchronism separating circuit (SYD) fed by an external video synchronism signal (SYN) associated with said external RGB video signal.

* * * * *